E. E. SLICK.
MANUFACTURE OF WHEELS.
APPLICATION FILED JUNE 25, 1907.

965,035.

Patented July 19, 1910.
2 SHEETS—SHEET 1.

E. E. SLICK.
MANUFACTURE OF WHEELS.
APPLICATION FILED JUNE 25, 1907.
965,035.
Patented July 19, 1910.
2 SHEETS—SHEET 2.
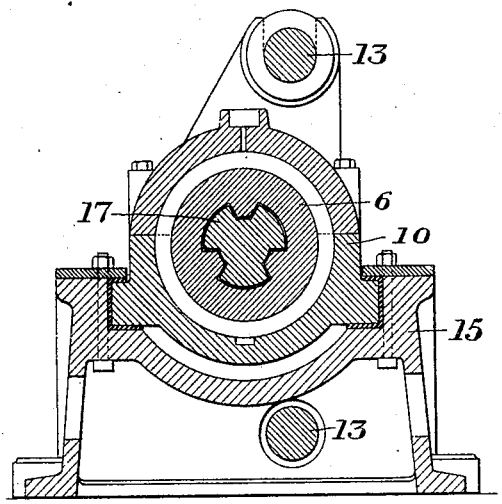
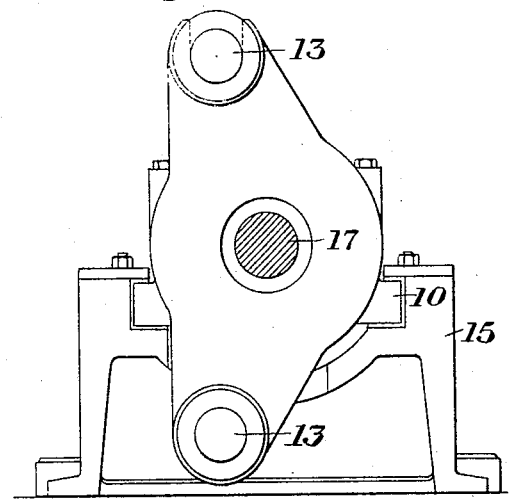
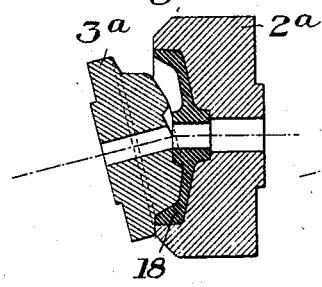
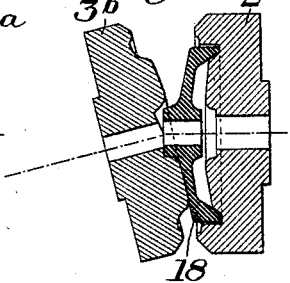
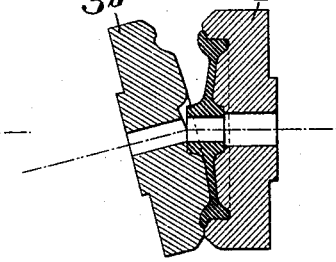
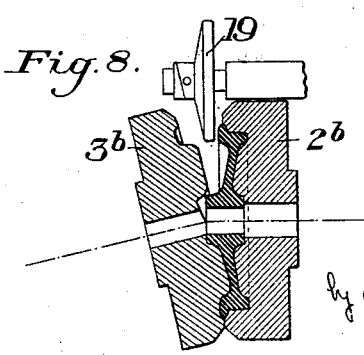

UNITED STATES PATENT OFFICE.

EDWIN E. SLICK, OF PITTSBURG, PENNSYLVANIA.

MANUFACTURE OF WHEELS.

965,035.  Specification of Letters Patent.  Patented July 19, 1910.

Application filed June 25, 1907. Serial No. 380,678.

*To all whom it may concern:*

Be it known that I, EDWIN E. SLICK, of Pittsburg, Allegheny county, Pennsylvania, have invented a new and useful Improvement in the Manufacture of Wheels, of which the following is a full, clear, and exact description, reference being had to the accompanying drawings, forming part of this specification, in which—

Figure 1:
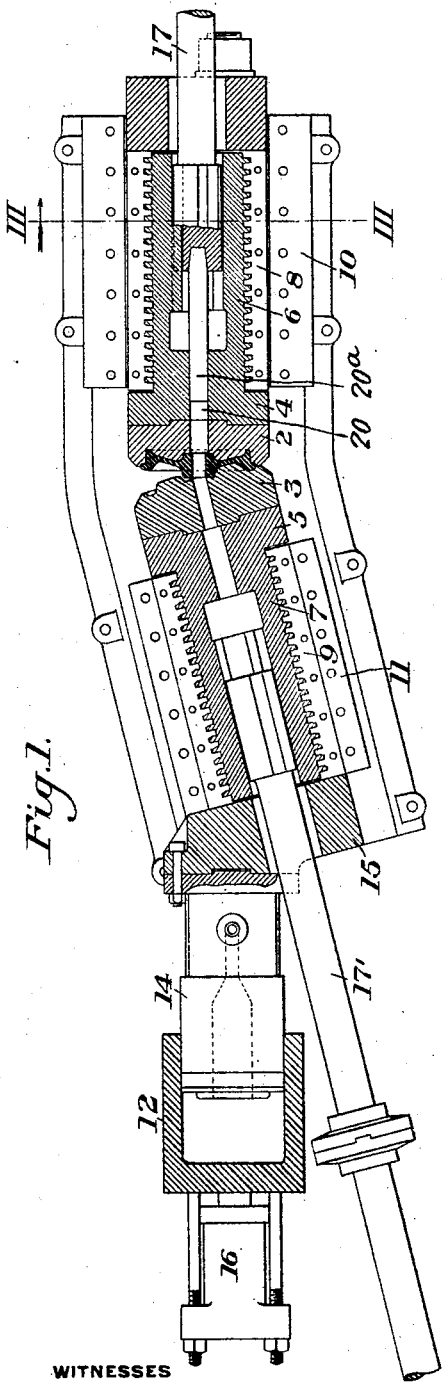
Figure 2:
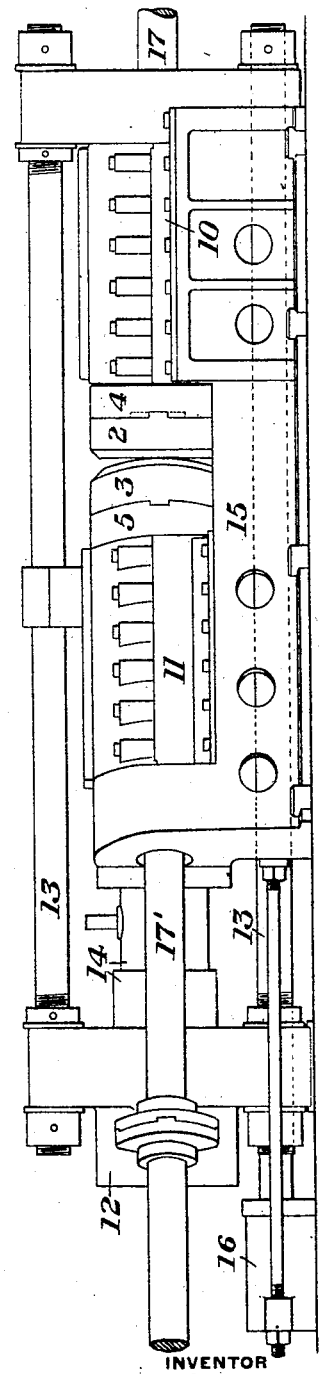

Figure 1 is a sectional plan view showing one form of apparatus for carrrying out my invention; Fig. 2 is a side elevation of the same; Fig. 3 is a cross-section on the line III—III of Fig. 1; Fig. 4 is an end elevation; Figs. 5, 6 and 7 are detail views of successive forming dies which I prefer to employ; and Fig. 8 is a detail view showing a forming wheel which I may employ.

My invention relates to the manufacture of wheels, particularly those having a continuous web joining the hub and rim as in the case of steel car wheels.

The object of the present invention is to reduce the number of operations in manufacturing steel car wheels, cheapen the product and increase the output.

The main feature of my invention consists in forging the wheel between rotating die surfaces whose axes are at an angle to each other, said dies having cavities to form the tread and flange portions of the wheel.

It further consists in forcing at least one of said die surfaces toward the other during the forging operation, and in certain other features hereinafter described and claimed.

In the drawings, 2 and 3 represent circular forging dies, each of which is removably bolted or otherwise secured to the heads 4 and 5 of shafts 6 and 7. These shafts whose axes extend at an oblique angle to each other are of large diameter, and adapted to withstand severe pressure; and for this purpose I preferably mount them in marine thrust bearings shown at 8 and 9. These marine thrust bearings are carried in side guides 10 and 11, and the one die 2 is adjusted or moved toward or from the other in a path extending in the direction of the axis of the movable die and at an angle to the axis of the fixed die by a single-acting cylinder 12, secured to the head 4 by tie rods 13. The cylinder is arranged to move over the stationary plunger 14 secured to the bed plate or frame 15.

16 is a single-acting pull-back cylinder by which the bearing and movable die may be returned after operating upon a blank. Each shaft with its head and die is positively rotated by wabbler connections with shafts 17 and 17′ extending through the hollow die-carrying shafts, and connected to any suitable actuating means. The die 3 is similar to the die 2, except that no means are provided for adjusting it endwise.

In carrying out my process, I preferably employ successive sets of forming dies in order to better shape the tread and flange portions and thoroughly work the metal. Fig. 5 shows the first set of dies $2^a$ and $3^a$ which I would employ in such case, the blank 18 being shown in this figure in its final form, produced by such dies. In using the dies, the blank is placed between them, the dies are then positively rotated by their connections, and one or both of them is forced toward the other to exert a forging pressure upon the metal. This forging pressure is exerted at one side of the dies, the points of their surfaces successively acting upon the portions of the metal at this side. The metal is thus reduced in thickness and increased in diameter, and is forced out into the form of the dies which at the shaping side form a closed pass. The blank is then removed from these dies, and preferably taken to a second forging press, the same as that containing the dies $2^a$ and $3^a$, such second press having the dies $2^b$ and $3^b$, shown in Figs. 6 and 7. The previous operation is then repeated upon the blank, Fig. 6 illustrating the beginning of the operation, and Fig. 7 the close of the operation. During this step, the forging pressure forces the outer portion of the blank into the form of the tread and rim, and gives them their final form. In this case as in the first dies, the dies at one side of their axes form a closed die pocket or pass which gives the metal its final form, as it is forced out under the forging pressure. The diameter of the blank is increased by the forging action, and the blank rotates at the same surface speed as the supporting die. During the approach of the dies in the forging operation, the length of the line of contact between the angularly mounted forming roll and the blank increases, and by reason of its angular axis of rotation, the radius of rotation or perpendicular distance from the axis of rotation of the forming die to the periphery of the blank increases with the enlargement of the blank, so that the forming roll rotates at less speed than the supporting die and gradually increases in speed until substantially equal to that of the forming die and blank being formed. The wheel may be completed in this operation, or it may be taken out, placed between clamping dies which inclose all portions of the wheel except the rim and tread, and a roller forced against the rim and tread to give the rotating blank a fine surface on these portions. This can be preferably continued until the blank is at a relatively low temperature.

Instead of using successive sets of dies, I may finish the metal in one set of dies, which would be such as shown in Figs. 6 and 7, or in Fig. 1. In such case, a wheel 19 may be employed, as shown in Fig. 8, which projects into the space between the dies at their open side. This wheel or roller tends to make uniform the side face of the flange by its pressure against the metal of the blank. Other mechanism may be employed instead of this wheel which would project into the open portion of the dies, and give the uniform spreading of the metal and avoid the formation of fins. This wheel or equivalent mechanism may also be employed in the case where two or more successive sets of dies are employed; and in such case, I would only need to employ it between the final sets of dies. In carrying out any of these methods, the dies act to confine the metal throughout a zone of the blank and limit its outward flow at the points desired.

The advantages of my invention result from the use of the rotating dies arranged at an angle to each other, and having coöperating die-shaping cavities which inclose the rim portion. This does away with the necessity for any external shaping wheel, and gives uniform results. The dies act not only as forging dies, but as shaping dies for the tread and rim portions.

It will be noted that the blanks are first curved or bent so as to dish the blanks and the portions of the tread and flange which contact with the rail in service are formed by forcing out the metal from the body of the blank, thus giving a good quality of material which has been thoroughly worked, in these portions.

Blanks such as are used in the manufacture of wheels and similar articles are liable to defects in the outer or edge portion thereof. It will also be noted that by bending the outer portion of the blank laterally, and then forming the flange from this intermediate part of the metal, I avoid the use of metal on such outer portions which is liable to be of poorer quality as it is less worked, in the flange portion.

I have shown the dies as provided with central openings 20 for removing the blank through which the pusher 20ª is arranged to slide and eject the wheel from the die 2, when this die is retracted after the wheel-forming operation is completed. The pusher 20ª is secured by one end on the end of the shaft 17, which projects into the hollow die-supporting shaft 6.

The dies may be solid if desired, and many other changes may be made in the form and arrangement of the dies, the number of sets employed, and means for rotating and moving said dies; either or both of the dies may be forced toward each other.

The invention may be applied to the formation of articles other than car wheels, and by the word "wheels" in my claims, I do not intend to limit myself to any specific product; and many other changes may be made without departing from the spirit and scope of my invention.

I claim:—

1. The method of forming metal, consisting in forging successive portions of the blank between rotating dies whose axes extend at an oblique angle to each other, and wholly shaping the outer portion of the blank within inclosing cavities of said dies; substantially as described.

2. The method of forming wheels, consisting in forging successive portions of the blank between rotating dies whose axes extend at an oblique angle to each other, and wholly shaping the rim portion of the wheel within inclosing cavities of said dies; substantially as described.

3. The method of forming wheels consisting in rolling the blank between rotary dies whose axes extend at an angle to each other, continuously forcing at least one of said dies toward the other during rotation and forming the rim portion of the wheel to substantially final form within the inclosing cavities formed in and by said dies; substantially as described.

4. In the forging of wheels, the steps comprising subjecting a blank to the rolling pressure of opposing dies having their axes at an angle to each other and during such forging causing a relative approach and relative radial movement of the dies, substantially as described.

5. The method of forming wheels, comprising rolling a blank between dies having their axes at an oblique angle to each other and during such rolling operation causing the dies to approach each other in such manner that the dies will have a relative radial movement, substantially as described.

6. The method of forming wheels having a tread and flange portion, consisting in forging successive portions of the blank between rotating dies whose axes extend at an angle to each other and wholly shaping the tread and rim portions of the wheel to final form within annular concentric grooves forming inclosing shaping cavities in said dies; substantially as described.

7. The method of forming metal consisting in forging successive portions of the blank between rotating dies having inclosing shaping die cavities whose axes extend at an angle to each other and wholly shaping the outer portion of the blank by forcing the metal outwardly into successive portions of said cavities formed in and by said dies at one side thereof; substantially as described.

8. The method of forming wheels which consists in forging successive portions of the blank between rotating dies whose axes extend at an angle to each other and forcing a portion of the body of the blank outwardly into inclosing cavities formed in and by said dies to form the flange of the wheels; substantially as described.

9. The method of forming wheels which consists in forging successive portions of the blank between rotating dies whose axes extend at an angle to each other, and radially displacing a portion of the blank outwardly beyond its tread portion into inclosing cavities formed in and by the dies to form the wheel flange; substantially as described.

10. In the manufacture of flanged wheels, the steps consisting in forming a circular blank and then successively forging radially varying portions of the blank, restricting the outward flow of metal at its periphery and at the same time forcing metal intermediate of the periphery and center of the blank to flow outward in a radial direction in at least one set of rotary dies having their axes at an oblique angle to each other, and then further shaping the outer portion of the partly formed blank in opposing die cavities formed in and by a set of finishing dies; substantially as described.

11. The method of forming wheels, which consists in forming a blank of smaller diameter than the finished wheel, forging said blank and increasing its diameter and forming the blank with a curved or bent outer portion in a set of roughing dies, then confining the edge of the bent outer portion and displacing metal intermediate of the center and periphery of the blank into inclosing die cavities formed in and by a second set of dies, and forming the flange of the wheel; substantially as described.

12. The method of forging metal consisting in rolling it between opposing concentric die faces having their axes at an oblique angle to each other, holding one of the dies against endwise movement during the forging and forcibly causing a relative approach of the dies; substantially as described.

13. The method of forging metal consisting in rolling it between concentric die faces having their axes at an oblique angle to each other, holding one of the dies against endwise movement and moving the face of the other die endwise toward the relatively fixed die in a path extending in the direction of the axis of the movable die; substantially as described.

14. The method of forming metal consisting in rolling it between opposing rotary dies having their axes at an oblique angle to each other, holding one of the dies against endwise movement during the forging and forcing the other die forward in a path at an angle to the axis of the opposing die; substantially as described.

15. The method of forming metal, consisting in forging it between rotary die faces having their axes extending at an oblique angle to each other, holding one of said dies against endwise movement and moving the face of the other die endwise toward the relatively fixed die in the direction of the axis of one of the dies, substantially as described.

16. The method of forming metal, consisting in forging it between concentric shaping die faces having their axes at an oblique angle to each other, holding one of said dies against endwise movement, keeping the axis of the blank parallel with the axis of one of the dies, and moving the opposing die in such manner that a rolling action is effected upon the metal to thereby displace the metal radially, substantially as described.

17. The method of forming metal consisting in rolling it between opposing concentric die faces having their axes at an angle to each other while forcing one of the dies toward the other, and at the same time limiting the outward flow of the metal during the forging operation at all points in its circumference; substantially as described.

18. In apparatus for forming metal, a pair of rotatable dies whose axes extend at an angle to each other, mechanism for forcing at least one of said dies endwise, and connections for rotating the dies, said dies having coacting cavities arranged to inclose the blank at one side thereof and shape the rim portion of the blank; substantially as described.

19. Apparatus for shaping metal, comprising rotary forging dies having coacting cavities arranged to wholly shape the outer portion of the metal blank therein, and having their axes extending at an angle to each other, mechanism arranged to move one die toward the opposite die, and means arranged to rotate at least one of said dies; substantially as described.

20. Apparatus for forming wheels, comprising rotary forging dies having coacting cavities arranged to wholly shape the rim portion of the wheel therein, and having their axes extending at an angle to each other, means for moving one die toward the opposite die while being rotated, and mechanism for rotating at least one of said dies; substantially as described.

21. The method of forging wheels, consisting in forming a dished blank by forging and then transferring the dished blank to a set of finishing dies having their axes extending at an oblique angle to each other, keeping the axis of the blank parallel to that of one of said dies, and finishing the periphery of the wheel, substantially as described.

22. Apparatus for forming metal, comprising rotary dies having opposing die faces and having their axes extending at an angle to each other, means for rotating the dies, and means for adjusting one die relative to the other, the die faces coacting at one side to form inclosing shaping cavities; substantially as described.

23. Apparatus for forming metal, comprising rotary dies having annular concentric grooves therein and having their axes extending at an angle to each other, means for rotating said dies, and means for adjusting one die relative to the other, the grooved die faces coacting at one side thereof to form inclosing shaping cavities; substantially as described.

24. Apparatus for forming flanged wheels, comprising rotary dies having annular concentric grooves therein, and having their axes extending at an angle to each other, means for rotating said dies, and means for adjusting one die relative to the other during rotation, the grooved die faces coacting at one side of the dies to form inclosing shaping cavities; substantially as described.

25. The method of forging wheels, consisting in dishing the blank and partially forming the web portion thereof between rotating dies having axes of rotation extending at oblique angles to each other and a relative path of approach endwise, and then transferring the partly formed blanks to a second set of dies and finishing the wheel, substantially as described.

26. The method of forming metal which consists in dishing and partly forming successive radial portions of the blank by roller forging between opposing faces of a set of dies having their axes at an oblique angle to each other, then removing the partly formed blank to a similar set of dies, continuing the forging operation therein and shaping the edge portions of the blank; substantially as described.

27. The method of forming metal wheels, consisting in forging successive portions of the blank between dies whose axes extend at an oblique angle to each other, and wholly shaping the outer portion of the blank within inclosing cavities of said dies; substantially as described.

28. The method of forming metal wheels, consisting in rolling the blank between opposing concentric die faces having their axes at an oblique angle to each other, holding one of the dies against endwise movement during the forging operation, while forcing the other die forward in a path at an angle to the axis of the opposing die, and at the same time limiting the outward flow of the metal during the forging operation at all points in its circumference; substantially as described.

29. The method of forging wheels, consisting in rolling it between rotary dies having their axes of rotation extending at an oblique angle to each other, holding one die against endwise movement and forcing the opposing dies forwardly in a path parallel to the axis of rotation of one of the dies, restricting the outward flow of metal in the periphery of the blank and forcing metal outwardly beyond the periphery of the blank to form the flange of the wheel, substantially as described.

30. The method of forming wheels, consisting in reducing a blank in thickness and increasing its diameter by two successive steps in successive dies, and forging the metal in at least one of said steps between concentric die faces having axes extending at an oblique angle to each other; substantially as described.

31. The method of forging wheels, consisting in rolling the blank between opposing die faces having their axes at an angle to each other, while forcing one of the dies toward the other, and at the same time restricting the flow of metal in at least a portion of its periphery and forcing metal intermediate of the restricted portion and center of the blank to form the flange of the wheel during the forging operation, substantially as described.

32. The method of forming metal wheels, which consists in forming a blank having a diameter less than that of the finished wheel, forging the blank by reducing its thickness and increasing its diameter, forming it with a curved or bent outer portion, then confining the edge of the bent outer portions and displacing metal intermediate of the hub and edge of the blank into inclosing die cavities to form the flange of the wheel; substantially as described.

33. The method of forming wheels, which consists in forming a blank of smaller diameter than the finished wheel, forging said blank to increase its diameter and form the blank with a curved or bent outer portion between sets of opposing dies having their axes at an oblique angle to each other, and then confining the edges of the bent outer portion in a second set of opposing dies having their axes at an oblique angle to each other and displacing the metal intermediate the hub and edge of the blank into the inclosing die cavities formed in and by said second set of dies, and forming the flange of the wheel; substantially as described.

34. The method of forming wheels, consisting in forging a blank between opposing dies having their axes at an oblique angle to each other by forcibly causing a relative approach endwise of the dies in a path at an angle to the axis of one of the dies and moving at least one of the dies to effect a rolling action on successive radial portions of the blank, the axes of the dies intersecting during the longitudinal movement thereof at a fixed point on the axis of one die and moving along the axis of the opposing die, substantially as described.

35. The method of forming wheels which consists in forging successive portions of the blank between rotating dies having their axes at an oblique angle to each other to thin and shape the web and forcing the displaced metal outwardly into inclosing cavities formed in and by said dies to form the flange of the wheel; substantially as described.

36. In the manufacture of flanged wheels, the steps consisting in forming a circular blank, successively forging radially varying portions of the blank, restricting outward flow of metal in at least a portion of its periphery and at the same time forcing metal intermediate of the center and the restricted portion of the blank to flow outward in a radial direction in at least one set of rotary dies having their axes at an oblique angle to each other, and then further shaping the outer portion of the partly formed blank in a set of opposing finishing dies, substantially as described.

37. The method of forming wheels, consisting in rolling the blank between rotating forming surfaces on the ends of shafts whose axes extend at an angle to each other, keeping the axis of the blank parallel with that of one of said forming surfaces, applying forging pressure to at least one of said surfaces to reduce successive portions of the web and roller-shaping the radially adjoining rim portion of the blank, substantially as described.

38. The method of forming wheels, consisting in rolling the blank between rotating forming surfaces on the ends of shafts whose axes extend at an angle to each other, keeping the axis of the blank parallel with that of one of said forming surfaces, applying forging pressure through at least one of said surfaces to reduce successive portions of the web and roller-shaping the rim of the blank, substantially as described.

39. The method of forming wheels, consisting in rotating a blank between rotating forming surfaces on the ends of shafts whose axes extend at an angle to each other, keeping the axis of the blank parallel with that of one of said forming surfaces, advancing the forming surfaces toward each other to reduce the thickness of successive portions of the web, and roller-shaping the rim portion of the blank, substantially as described.

40. The method of forming wheels, consisting in rolling the blank between rotating forming surfaces whose axes extend at an oblique angle to each other and whose pressure is exerted lengthwise of the said axes, keeping the axis of the blank parallel with that of one of said forming surfaces, applying forging pressure through at least one of said surfaces to reduce successive portions of the web, and roller-shaping the radially adjoining rim portion of the blank, substantially as described.

41. The method of forming wheels, consisting in rolling a blank between rotating forming surfaces whose axes extend at an angle to each other and whose pressure is exerted upon the blank lengthwise of the said axes, keeping the axis of the blank parallel with that of one of said forming surfaces, applying forging pressure through at least one of said surfaces to reduce successive portions of the web, and simultaneously roller-shaping the radially adjoining rim portion of the blank, substantially as described.

42. The method of forming wheels, consisting in forging a blank by pressing against the same a rotating forming surface whose axis extends at an oblique angle to the axis of the blank, holding the blank in surface contact with an opposing forming surface during the forging operation and causing a relative approach of the forming surfaces in the direction of the axis of the blank, substantially as described.

43. Apparatus for forming wheels, comprising in combination a rotating shaping roll having its axis at an angle to that of the blank and adapted to make line contact at its end with the blank, and a supporting die having its axis parallel with that of the blank and arranged to make surface contact with the other side of the blank, and means for causing endwise approach of the die and roll in a path extending in the direction of the axes of the die and blank, substantially as described.

44. Apparatus for forming wheels, comprising in combination a rotating shaping roll having a die surface adapted to make line contact at its end with the blank, a supporting roll having a die surface adapted to make surface contact with the other side of the blank, said die surfaces having their axes at an oblique angle to each other, and means for pressing the supporting roll against the blank in the direction of the axis of the blank and for maintaining the supporting roll in surface contact with one face of the blank and the shaping roll in line contact with the opposite face of the blank, substantially as described.

45. The method of forming wheels, consisting in rolling a blank between rotating forming surfaces, whose axes extend at an oblique angle to each other and whose pressure is exerted upon the blank lengthwise of the said axes, keeping the axis of the blank parallel with that of one of said forming surfaces, and simultaneously rolling the rim portion to the desired form, substantially as described.

46. Apparatus for forming wheels, comprising in combination a support for one face of the blank and a shaping roll adapted to contact with the opposite face of the blank on the support, the axes of rotation of said support and roll extending at an oblique angle to each other, and means for causing the approach of said support and shaping roll and to maintain said support in surface contact with one face of the blank, and the shaping roll in line contact with the opposite face of the blank, said support and roll being arranged to approach in the direction of the axis of the blank on said support, substantially as described.

47. The method of forming wheels, consisting in forging by rolling pressure successive radial portions of the blank by pressing against a forming surface having line contact therewith, whose axis extends at an oblique angle to that of the blank and whose pressure is exerted upon the blank longitudinally of the axis of said forming surface and holding the blank in position upon an opposing die having a surface contact with the blank, substantially as described.

48. The method of forming wheels, consisting in roller-forging the blank by pressing successive radial portions thereof against a forming surface having a line contact therewith and whose axis extends at an oblique angle to that of the blank, holding the blank in position upon an opposing die so as to have a surface contact with the blank, and causing the approach endwise of the supporting and forming surfaces during the roller-forging operations in a path extending in the direction of the axis of the blank, substantially as described.

49. The method of forming wheels, consisting in forging a blank having an enlarged peripheral portion and then transferring the blank to a set of finishing dies having their axes extending at an oblique angle to each other, keeping the axis of the blank parallel to that of one of said dies, and finishing the periphery of the wheel, substantially as described.

50. The method of forging wheels, consisting in forging a blank and forming an enlarged peripheral edge portion thereon between rotating dies having their axes of rotation extending at oblique angles to each other and a relative path of movement endwise, and then transferring the partly formed blanks to a second set of dies and finishing the wheel, substantially as described.

51. The method of forming wheels, consisting in rolling the blank between rotating forming surfaces on the ends of shafts whose axes extend at an angle to each other, keeping the axis of the blank parallel with that of one of said forming surfaces, applying forging pressure to at least one of said surfaces to reduce successive portions of the blank, and roller-shaping the radial adjoining rim portion of the blank, substantially as described.

52. The method of forming wheels, consisting in rolling the blank between rotating forming surfaces on the ends of shafts whose axes extend at an angle to each other, keeping the axis of the blank parallel with that of one of said forming surfaces, applying forging pressure to at least one of said surfaces to reduce successive portions of the web, and simultaneously roller-shaping the rim portion of the blank, substantially as described.

53. The method of forming metal, consisting in rolling it between opposing concentric die faces having their axes at an angle to each other while forcing one of the dies toward the other, and at the same time limiting the outward flow of the metal during the forging operation throughout a zone of the metal, substantially as described.

54. In a forging press, carriers having rotatable die holders mounted therein, whose axes extend at an oblique angle to each other, one of said carriers being held against movement in the direction of the axis of one of the holders, the other of the carriers being mounted so as to permit of movement toward the opposite carrier obliquely to the axis of one of the holders, substantially as described.

55. In a forging press, carriers having rotatable die holders mounted thereon whose axes extend at an oblique angle to each other, one of said carriers being mounted so as to permit of movement toward the opposite carrier in the direction of the axis of one of the holders, substantially as described.

56. In a forging press, carriers having rotatable die holders mounted thereon, whose axes extend at an oblique angle to each other, one of said carriers being mounted so as to permit of movement toward the opposite carrier obliquely to the axis of one of the holders, substantially as described.

57. In a forging press, carriers having rotatable die holders mounted thereon whose axes extend at an oblique angle to each other, forming faces on the opposing ends of the carriers, one of said carriers being held against movement in the direction of the axis of one of the holders, the other of said carriers being mounted so as to permit of movement toward the opposite carrier in the direction of the axis of one of the holders, substantially as described.

58. In a forging press, carriers having rotatable die holders mounted thereon, whose axes extend at an oblique angle to each other and forming faces on the opposing ends of the holders, one of said carriers being held against movement in the direction of the axis of one of the holders, the other of said carriers being mounted so as to permit of movement toward the opposite carrier obliquely to the axis of one of the holders, substantially as described.

59. In a forging press, carriers having rotatable die holders mounted thereon whose axes extend at an oblique angle to each other and forming faces on the opposing ends of the holders, one of said carriers being mounted so as to permit of movement toward the opposite carrier in the direction of the axis of one of the holders, substantially as described.

60. In a forging press, carriers having rotatable die holders mounted thereon whose axes extend at an oblique angle to each other and forming faces on the opposing ends of the carriers, one of said carriers being mounted so as to permit of movement toward the opposite carrier obliquely to the axis of one of the holders, substantially as described.

61. In a forging press, shafts having opposing die faces thereon and having their axes at an oblique angle to each other, and carriers on which said shafts are rotatably mounted, one of said carriers being adjustable toward and away from the opposite carrier in the direction of the axis of rotation of the movable shaft, and means for adjusting the movable carrier, substantially as described.

62. In a forging press, carriers having rotary shafts mounted thereon whose axes extend at an oblique angle to each other, forming die surfaces secured on the opposing ends of said shafts, and means for causing the approach of the die surfaces and carriers in the direction of the axis of one of said shafts, substantially as described.

63. In a forging press, carriers having rotary shafts mounted thereon whose axes extend at an oblique angle to each other, forming die surfaces secured on opposing ends of said shafts, and means for causing the approach of the die surfaces and carriers in a direction obliquely to the axis of one of said shafts, substantially as described.

64. In roller-forging apparatus, a pair of rotary dies having their axes at an angle to each other, at least one of said dies having a face of the desired contour, and means for causing a relative axial movement of said dies toward each other, said means being arranged to spread the blank and force it into the die having the desired contour to cause the blank to conform thereto, substantially as described.

65. Apparatus for forging, comprising opposing dies, means for causing a relative approach of said dies, and means for rotating the dies, at least one of said dies having peripheral forming cavities, one of the dies rotating at less speed than the opposing die surface, substantially as described.

66. Apparatus for forging, comprising rotary die carriers having die surfaces on their ends, means for causing a relative approach of said die surfaces, and means for rotating the surfaces, the surface speed of one of said dies gradually increasing relative to that of the other die surface during the forging operation, substantially as described.

67. The method of forging metal, consisting in subjecting a blank to pressure between rotary dies having opposing end faces and having their axes at an angle to each other, causing the approach endwise of said dies so as to spread the metal on one die, and causing it to conform to the contour of said die, and restricting the outward flow of the metal, substantially as described.

68. In a forging press, carriers having rotatable die holders mounted thereon, one of said carriers being held against movement in the direction of the axis of one of the holders and the other of the carriers being mounted so as to permit of movement toward the opposite carrier in the direction of the axis of one of the carriers, substantially as described.

69. The method of forming wheels, consisting in rolling a blank between rotating forming surfaces on the ends of shafts whose axes extend at an angle to each other, keeping the axis of the blank parallel with that of one of said forming surfaces, and rolling the rim portion to the desired form, substantially as described.

70. In a forging press, carriers having rotatable die holders mounted therein, whose axes extend at an oblique angle to each other, one of said carriers being held against movement in the direction of the axis of one of the holders, the other of the carriers being mounted so as to permit of movement toward the opposite carrier in the direction of the axis of one of the holders, substantially as described.

71. The method of forming metal, consisting in forging the blanks between rotary die forming surfaces having their axes at an oblique angle to each other, keeping the axis of the blank parallel with that of one of said dies, and causing the approach of the rotating dies in a path extending in the direction of the axes of the blank and one of the dies, to thereby upset the face of the blank contacting with the face of the angularly mounted dies, substantially as described.

72. The method of forming metal consisting in forging the blanks between rotary die-forming surfaces, centering the blank on and maintaining its axis parallel with the axis of one of said dies, and causing endwise approach of the rotating dies, and thereby upsetting the face of the blank contacting with the other of the dies, substantially as described.

73. The method of forming metal, which consists in forging the blank between rotary shaping die faces having their axes at an oblique angle to each other, while maintaining the axis of the blank parallel with that of one of said shaping die faces, and causing endwise approach of the dies in a path parallel to the axes of one die face and the blank to thereby effect a rolling action on the metal and upset the face of the metal contacting with the angularly mounted die face, substantially as described.

74. In apparatus for forging metal, a pair of opposing dies one of said dies being movable and having an opening therethrough, connections for forcibly advancing and retracting the movable die, and means operating through the opening in the movable die adapted to contact with and eject metal blanks on said die; substantially as described.

75. In apparatus for forging metal, opposing dies having die-forming faces, one of said dies having an opening therethrough, mechanism operating through the opening adapted to contact with and eject metal blanks on said die-forming faces and means arranged to move the die in which the ejecting mechanism operates sufficiently to cause the blank to be ejected by said mechanism; substantially as described.

76. In apparatus for forging metal, die carriers having opposing end die surfaces, an opening extending through one of said carriers and die surfaces, mechanism operating through said opening adapted to contact with and eject metal from said die surface, and means for actuating said die surface to bring the metal into contact with said ejecting mechanism; substantially as described.

In testimony whereof, I have hereunto set my hand.

EDWIN E. SLICK.

Witnesses:
R. D. LITTLE,
H. M. CORWIN.